US008640038B1

(12) United States Patent
Reeser et al.

(10) Patent No.: US 8,640,038 B1
(45) Date of Patent: Jan. 28, 2014

(54) SCENE CREATION FOR BUILDING AUTOMATION SYSTEMS

(71) Applicant: State Farm Mutual Automobile Insurance Company, Bloomington, IL (US)

(72) Inventors: Andrew Reeser, Heyworth, IL (US); Shawn M. Call, Bloomington, IL (US); Stacy L. Kennedy, Bloomington, IL (US); Lee C. Drinan, Bloomington, IL (US); Lisa Ann Frey, Normal, IL (US); Kevin Payne, Lexington, IL (US); Michael Jacob, Le Roy, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/941,280

(22) Filed: Jul. 12, 2013

Related U.S. Application Data

(63) Continuation of application No. 13/602,937, filed on Sep. 4, 2012, now Pat. No. 8,490,006.

(51) Int. Cl.
*G06F 3/048* (2013.01)
*G05B 11/01* (2006.01)
*G05B 15/00* (2006.01)
*G06K 9/00* (2006.01)
*G06K 9/68* (2006.01)

(52) U.S. Cl.
USPC ............. 715/762; 715/761; 715/765; 700/17; 700/65; 700/83; 382/155; 382/170; 382/181; 382/218

(58) Field of Classification Search
USPC .......... 715/761–762, 765; 700/17–20, 65–66, 700/83; 382/154–155, 170, 181, 218
See application file for complete search history.

(56) References Cited

U.S. PATENT DOCUMENTS

| 5,086,385 | A | * | 2/1992 | Launey et al. ................... 700/83 |
| 2007/0237514 | A1 | * | 10/2007 | Pillman et al. ................ 396/153 |
| 2010/0035682 | A1 | * | 2/2010 | Gentile et al. .................. 463/30 |
| 2010/0138007 | A1 | * | 6/2010 | Clark et al. ..................... 700/90 |
| 2010/0169958 | A1 | * | 7/2010 | Werner et al. ..................... 726/6 |
| 2010/0171837 | A1 | * | 7/2010 | Pillman et al. ................ 348/187 |
| 2010/0303363 | A1 | * | 12/2010 | Fedorovskaya et al. ...... 382/199 |
| 2011/0314049 | A1 | * | 12/2011 | Poirier et al. ................. 707/769 |
| 2012/0020559 | A1 | * | 1/2012 | Deng et al. .................... 382/173 |
| 2012/0195370 | A1 | * | 8/2012 | Guerrero ................. 375/240.02 |
| 2012/0274776 | A1 | * | 11/2012 | Gupta et al. ................... 348/159 |

\* cited by examiner

*Primary Examiner* — Ramesh Patel
(74) *Attorney, Agent, or Firm* — Marshall, Gerstein & Borun LLP; Randall G. Rueth

(57) ABSTRACT

Systems and methods receive, from a building, an inventory identifying a plurality of electronic devices associated with a building automation system. The systems and methods compare the inventory to an additional inventory associated with an additional building automation system of an additional building to determine that the inventory is the same as or similar to the additional inventory, wherein the additional inventory identifies a plurality of additional electronic devices. The systems and methods further identify an automation scene that coordinates operation of at least a portion of the plurality of additional electronic devices and provide the automation scene to the building for implementation in the building automation system.

20 Claims, 4 Drawing Sheets

SCENE CREATION FOR BUILDING AUTOMATION SYSTEMS

CROSS REFERENCE TO RELATED APPLICATIONS

This application is a continuation of and claims priority to U.S. patent application Ser. No. 13/602,937 filed Sep. 4, 2012, and titled "SCENE CREATION FOR BUILDING AUTOMATION SYSTEMS", which is hereby incorporated by reference herein in its entirety.

TECHNICAL FIELD

This disclosure is directed to a system and method for creation of scenes in a building automation and/or monitoring systems, particularly home automation and monitoring systems.

BACKGROUND

This Background is intended to provide the basic context of this patent application and it is not intended to describe a specific problem to be solved.

Home automation systems are becoming more popular both as a convenience and as an energy-saving mechanism. The use of home automation equipment to turn off unneeded lights and appliances, adjust thermostats even on a room-by-room basis as needed or based on outside weather conditions all contribute to a reduction in energy consumption and corresponding cost saving. The addition of smoke detectors, door/window position sensors, glass break detectors, and even water sensors, add the ability to monitor the status of a home or business with respect to different emergency situations. The combination of control points and sensors creates a virtually limitless palette of options for home automation. However, programming these various actuators and sensors or even knowing what conditions to monitor may require professional help, extensive training, or time consuming experimentation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of suggesting an automation scene for a building having a building automation system configured with a controller for controlling a plurality of electronic devices is provided in one embodiment. The method comprises receiving, at a remote server from the controller via a network, an inventory identifying the plurality of electronic devices; and comparing, by the remote server, the inventory to an additional inventory associated with an additional building automation system of an additional building to determine that the inventory is the same as or similar to the additional inventory, the additional inventory identifying a plurality of additional electronic devices implemented in the additional building automation system. The method further comprises identifying an automation scene that coordinates operation of at least a portion of the plurality of additional electronic devices, and providing, to the controller via the network, the automation scene for implementation in the building automation system.

A system for suggesting an automation scene for a building having a building automation system for controlling a plurality of electronic devices is provided in another embodiment. The system comprises a network interface adapted to receive, from the building, an inventory identifying the plurality of electronic devices, a memory configured to store an additional inventory associated with an additional building automation system of an additional building, and a processor adapted to interface with the network interface and the memory. The processor is configured to execute computer executable instructions stored in the memory to cause the processor to compare the inventory to the additional inventory to determine that the inventory is the same as or similar to the additional inventory, the additional inventory identifying a plurality of additional electronic devices implemented in the additional building automation system, identify an automation scene that coordinates operation of at least a portion of the plurality of additional electronic devices, and provide, to the building via the network interface, the automation scene for implementation in the building automation system.

A computer readable storage medium comprising non-transitory computer readable instructions stored thereon for suggesting an automation scene for a building having a building automation system for controlling a plurality of electronic devices is provided in another embodiment. The instructions when executed on a processor cause the processor to receive, from the building via a network, an inventory identifying the plurality of electronic devices, and compare the inventory to an additional inventory associated with an additional building automation system of an additional building to determine that the inventory is the same as or similar to the additional inventory, the additional inventory identifying a plurality of additional electronic devices implemented in the additional building automation system. The instructions when executed on the processor further cause the processor to identify an automation scene that coordinates operation of at least a portion of the plurality of additional electronic devices, and provide, to the building via the network, the automation scene for implementation in the building automation system.

DETAILED DESCRIPTION OF THE INVENTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
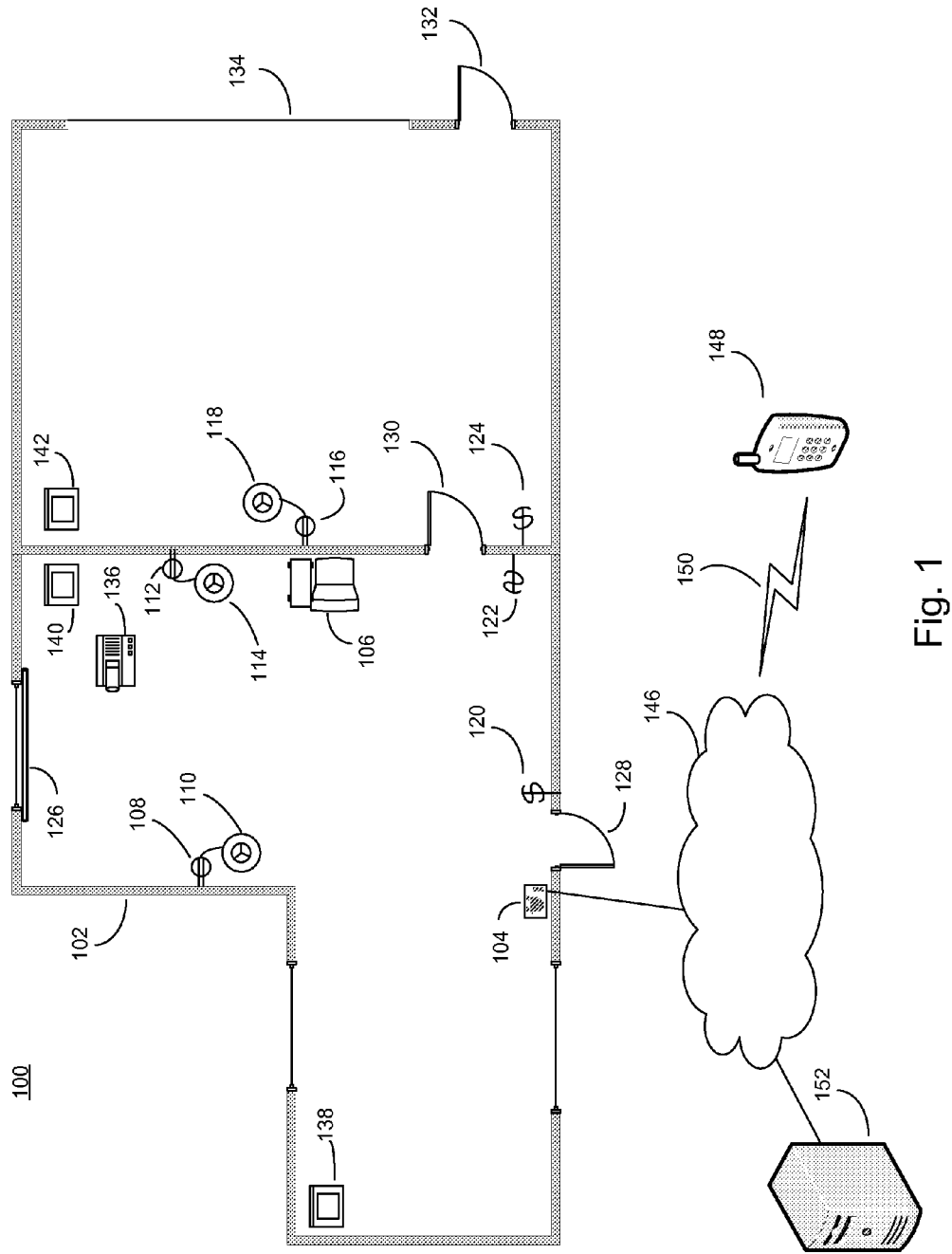
FIG. 1 is a block diagram of an exemplary home automation system.

FIG. 1 is a block diagram of an exemplary home automation system 100. The greatly simplified home 102 is used to illustrate an embodiment that illustrates the operation and interactions of system components. While the home 102 is not technically a part of the automation system, it is useful to consider the system in the context of a home 102 or other building. A controller 104 is coupled electrically to other system components, described below. System communication may be wireless, for example, via a Zigbee protocol, may use power line communication such as X10 or Insteon protocols, or other communication media or protocols. In some embodiments, the controller 104 may be mirrored or replaced by a computer 106 that may also have access to the relevant protocol or protocols. Both the controller 104 and the computer 106 may have access to an external server 152 via a network 146, such as the Internet.

A first controllable unit, an outlet 108 may be connected to a lamp 110. Another controllable unit, an outlet 112 may be connected to a second lamp 114 while a third controller unit, an outlet 116 may be coupled to a third lamp 118. The controllable units 108, 114, and 116 may receive control messages from the controller 104 to turn their respective lamps 110, 114, 118 on or off. In addition, each controller may sense when a lamp is manually turned on or off and may operate the lamp accordingly. That is, if a lamp 110 is off as a response to a message from the controller 104, manually turning the lamp switch (not depicted) off and back on will cause the controllable unit 108 to turn on the electricity to the lamp and also to send a message to the controller 104 that the lamp has been turned on. The controller 104 may log the time, a reference to the controllable unit 108, and the change in state, in this example, from off to on. In some embodiments, a controllable unit may be identified by a type and location rather than a simple identifier, for example, 'living room west table lamp.'

The home automation system 100 may also include a number of switches 120, 122, 124 that may each control another electronic device that are not depicted for the sake of clarity, such as an overhead light, an outside light, or an outlet, either one already having its own controllable unit or one wired directly to the switch. Like the outlets 108, 112, and 116, a manually controllable electronic device coupled to a switch may also activate the switch and cause a status message to be sent to the controller 104. A controllable window shade 126 may be remotely controllable via a control unit (not depicted) and may also be capable of reporting a state of the shade, such as a percentage it is closed. A projector 136 may also be controllable and may report status, such as on/off, to the controller 104.

A number of sensors may be part of the home automation system 100. Doors 128, 130 and 132 may have corresponding sensors that monitor the status of each respective door as being open, closed, locked, or unlocked. A garage door 134 may have a similar sensor that monitors its state. Motion sensors 138, 140, and 142 may report motion within their respective field of coverage.

In addition to communication with a server 152, the controller 104 may be capable of communication with a smart phone 148 via a wireless link 150, either directly, such as via an 802.11 network (WiFi) or via a cellular telephone network and the Internet 146.

Figure 2:
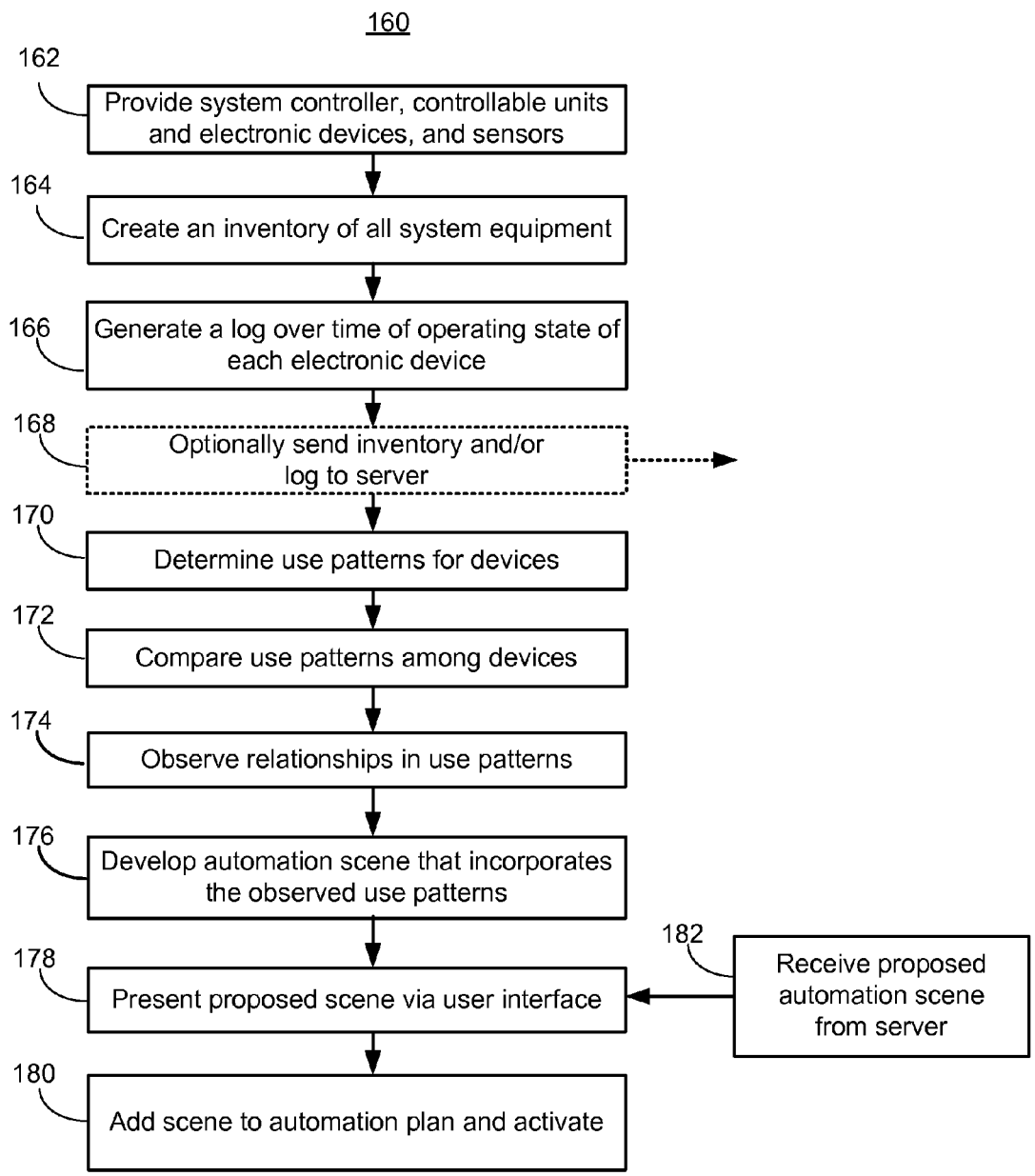
FIG. 2 is a flow chart illustrating a process for scene creation for a home automation system.

FIG. 2 illustrates a process or method 160 for scene creation using the exemplary automation system 100 of FIG. 1. A system including a controller 104, controllable units and associated electronic devices, e.g. outlet 108 and lamp 110, and sensors, e.g., motion sensor 128 is used to illustrate an exemplary embodiment (block 162). The controller 104 may create an inventory of all system equipment (block 164). For example, as each system element, either another controller 106, controllable unit and associated electronic device, sensor, etc., is added, the controller 104 (or controller 106), may update an inventory list of the equipment. As discussed above, the inventory may include not only the equipment, but the location and type of equipment, as well as the range of available control, type of status, or both. For example, some lamps are not dimmable, so an associated controller may only report the lamp as off or on. Dimmable lamps may be listed as 100% dimmable and have status information that reflects the current dimming state. Also as discussed above, a door or window may have both open/closed and locked/unlocked status information. When more information about the electronic device or sensor is available, such as a location, range of control, etc., more robust scenes can be developed that take advantage of all available inputs and controls. Additionally, better descriptive information allows scene information to be more easily understood. The value of a more informative description is illustrated by a comparison of a device-oriented system description such as: controllable unit no.: 882, 20%, 2200, and a more human readable description such as: the west living room lamp is programmed to dim to 20% at 10:00 pm. In an embodiment, in order to standardize scene descriptions, the inventory may include a standardized functional description. Such a description may be selected, for example, from a drop down list specifying common functions, such as, but not limited to, "main entrance," "patio sliding door," "dining room overhead light," "entrance door motion detector," etc. In doing so, scenes may be matched by function, rather than just equipment list. This may be particularly helpful when selecting suggested scenes at a server based on inventory and/or function, as described below.

A log of operating states of each piece of equipment is created over a period of time (block 166). For example, each change in state of a controlled electronic device and each activation of a sensor may be logged in a time sequence.

Optionally, the system inventory and the log may be sent to a server, such as server 152 of FIG. 1 (block 168). Operations performed at the server are discussed below with respect to FIG. 3.

Using the log created at block 164, an analysis of usage patterns may be developed (block 170). For example, lamp 114 is turned on in the early evening and stays on for approximately 3.5 hours. Further, the patterns may be compared among devices (block 172), such as shade 126 is almost always lowered before the projector 136 is turned on. Additionally, further analysis of these patterns may be examined for broader relationships (block 174). For example, between 5:00 pm and 7:00 pm, a sequence of the following may occur multiple days per week: garage door 134 opens and closes, door 130 opens, light 118 is turned off via switch 124, switch 122 is activated, motion detector 140 is activated, shade 126 is lowered, projector 136 is turned on, and lamp 114 is turned on. An algorithm may systematically review all sensor activations and device status changes to determine causal events and their related responses. In the scenario above, the garage door 134 may be used to activate a scene involving everything from the lighting changes to the projector turning on. Optionally intermediate triggers, such as the door 130 opening or motion sensor 140 activation, may be used to continue a paused scene but in another case, everything but light 118 turning off may be executed without interruption.

The algorithm may also include time of day characterizations, so that the above scene is played on weekday evenings, but the garage door opening on a Saturday morning does not activate that particular scene.

Using these patterns and relationships, the controller 104, or optionally, an external server 152, may develop one or more proposed scenes for incorporation into the home automation system 100 (block 176).

After a scene has been generated, the scene may be presented to a user for adoption into the home automation system 100 (block 178). The scene may display both the sequence of activations/deactivations and the qualifiers which trigger the scene, such as sensor activity and time of day. A user may be given the opportunity to update or amend the scene before activation.

Upon approval by the user, the proposed scene may be added to the home automation system (block 180) and activated. Alternatively, the new scene may be stored but not activated, for example, pending a particular circumstance, such as a vacation or for seasonal differences. The data logging may be done on a long term basis, so that current scenes may evolve based on manual intervention in a scene, or for slowly varying conditions such as the length of daylight hours, school year and summer patterns, etc. As discussed more below, proposed scenes for home automation may be received from, for example, an external server (block 182).

Figure 3:
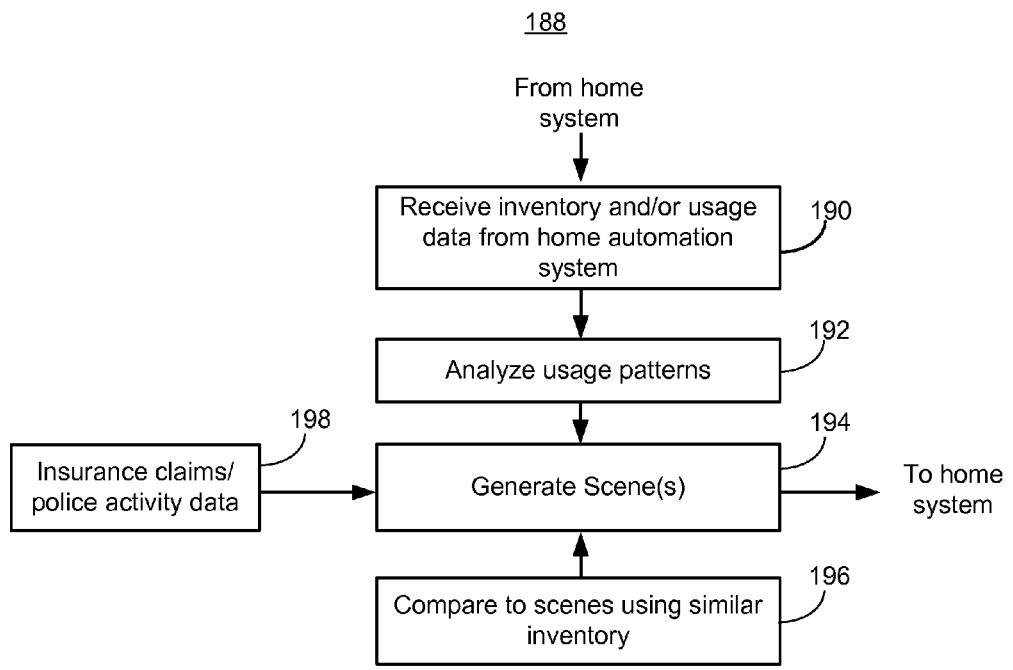
FIG. 3 is a flow chart illustrating a process for remote creation of scenes for a home automation system.

FIG. 3 illustrates a method or process 188 for remote creation of scenes for a home automation system 100. A server, such as server 152 of FIG. 1 may receive an inventory of home automation equipment such as controllable units, corresponding electronic devices, and sensors for a particular home or building (block 190). The server 152 may use the inventory in three ways to generate scenes for use in the home system 100.

First, in an embodiment, the inventory may also include usage data, such as log data generated at the user site, such as log data generated at block 166 of FIG. 2. When log data is included, an analysis of the log data with respect to the inventory of equipment may be performed, as described above, to generate scenes for use in home automation (block 192).

In another embodiment, the inventory may be used to compare the inventory to other known installations having similar equipment controlling similar electronic devices to suggest scenes found in the those similar systems (block 196). For example, unlocking and opening a front entry door 128 may cause activation of the light switch 120 and opening the shade 126 if the outside temperature is below 75 degrees. An algorithm for scene selection may involve matching not only the part numbers of the controllable units, but the functional identification of their use. In the above example, the elements may be identified as front entry door sensor, front entry light switch, and south-facing curtain, for example. While a robust pool of system inventories may include an identical match for a particular system, such an identical match may not be necessary. For example, a particular scene may only require a subset of controllable units and associated electronic devices. Therefore, an inventory from the pool may only need to be similar such that an overlap of equipment required to implement a particular scene is present.

In yet another embodiment, the inventory may be used to generate scenes based on insurance claim data, either generically or based on a specific set of data (block 198). If an inventory includes a basement water sensor and a compatible controller (not depicted), a scene based on their use based on flood damage claims, particularly in that geographic region, may incorporate calling a designated cell phone after activation of the water sensor. Similarly, a rash of break-in crimes in an area may cause suggestion of a scene that incorporates much more strict monitoring of windows and motion sensors than would normally be used.

Figure 4:
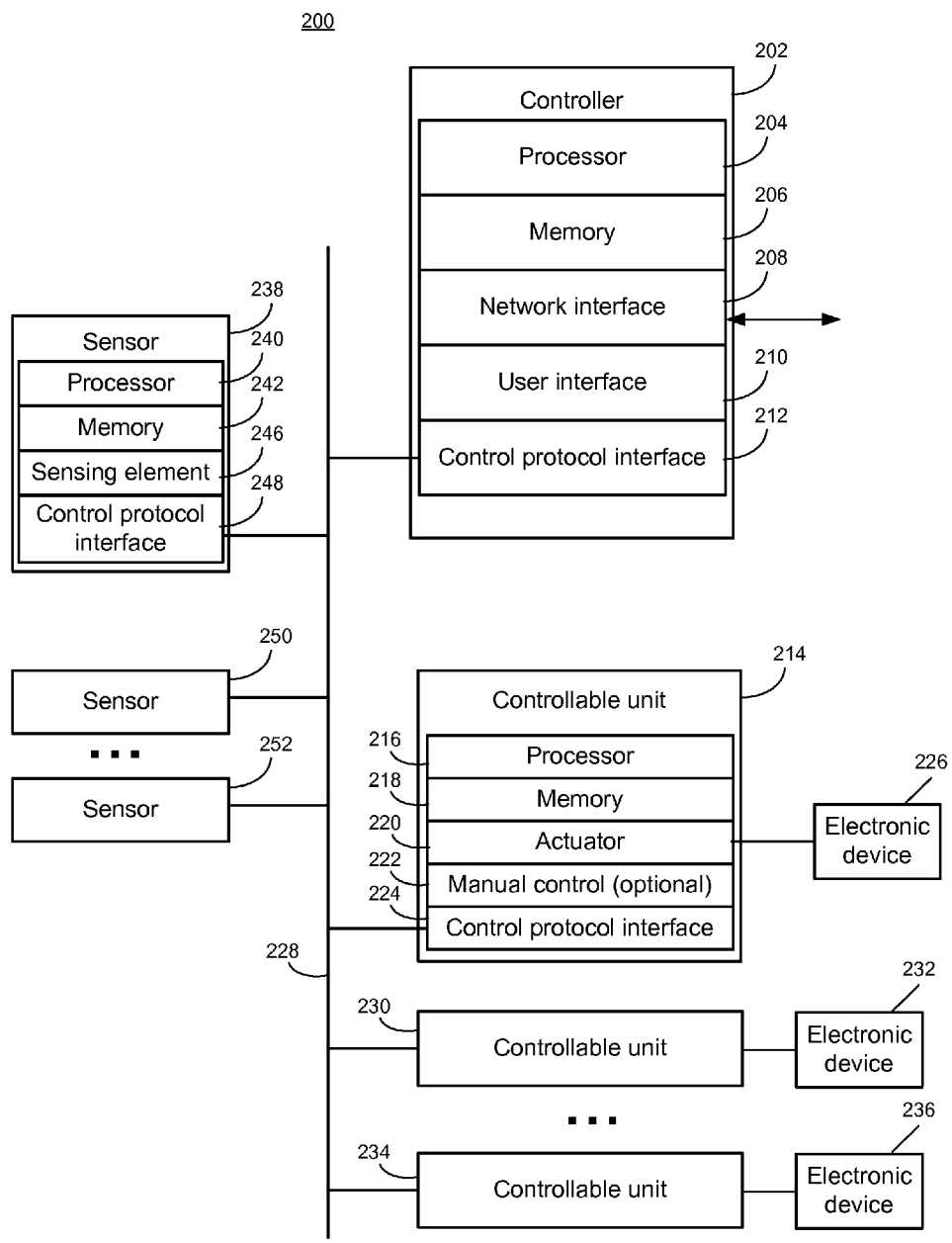
FIG. 4 is a simplified and exemplary block diagram of home automation components.

FIG. 4 is a simplified and exemplary block diagram of components of a home automation system 200. A controller 202 may be in communication with a number of controllable units 214, 230, and 234, each coupled to a respective electronic device 226, 232, and 236. In some embodiments, different equipment configurations may provide for a single controllable unit to control more than one electronic device. For ease of illustration, such a configuration is not illustrated. Additionally, sensors 238, 250, and 252 may be used to monitor conditions such as motion, temperature, smoke, water, door status, etc.

The controller 202 may include a processor 204 that executes instructions stored in a memory 206. The memory 204 may be a semiconductor memory, magnetically readable memory, optically readable memory or combination of these or other physically implemented memory technologies, for example, but does not include transitory media such as carrier waves.

The controller 202 may also include a network interface 208 suitable for communication via a wide area network such as network 146 of FIG. 1, including, but not limited to, the Internet, a telephone network, or a cellular telephone network. The network interface may be used to upload configuration and inventory information as described above, may be used for system diagnostics by a remote troubleshooting facility, or to send system status or receive system instructions. A user interface 210 may provide users with a mechanism to interact with the system, for example, to determine system status or as described above, to accept or modify scene suggestions developed by the controller 202 or received via the network interface 208. A control protocol interface 212 may be used to communicate with other system elements, such as controllable units and sensors. Many known protocol interfaces may be supported, such as powerline protocols X10 or Insteon, or wireless protocols, such as Zigbee, although other communication protocols including IEEE 802.11 (WiFi) or others may be used. In some embodiments, the control protocol interface 212 may be protocol agile, so that controllable units using different control protocols maybe mixed in a system by sending control messages readable by some controllable units but not others.

A controllable unit 214 may include a processor 216 and a memory 218 as described above. An actuator 220 may be connected to an electronic device 226 and may control operation of the electronic device 226. The actuator 220 may be a relay, a solid state switch, such as a dimmer, a motor controller, etc., based on the nature of the electronic device 226 for which it is intended to operate. A manual control 222 may provide local operation of the electronic device 226 by a user. For example, a light switch may be controllable via instructions from the controller 202, but would obviously also have a physical switch that could be used to override a currently programmed setting. When a change in the state of the switch is made via a manual action, the state change may be reported to the controller 202 for logging and use in the creation of updating of scenes. The controllable unit 214 may also include a control protocol interface 224 for communication with the controller 202 via its corresponding control protocol interface 212.

The system 100 may include multiple controllable units 230, 234 controlling respective electronic devices 232 and 236. The controllers 230 and 234, etc., may vary in the nature of its actuator 220, but are otherwise the same or similar. While some systems have practical limits on the number of controllable devices, other systems have limits in the thousands or above, so that no practical limit exists.

A sensor 238 may include a processor 240 and a memory 242 as described above. A sensing element 246 may vary based on the application to which the sensor is directed. For example, the sensor may be a magnetically operated door sensor, may be a temperature sensor, a water or moisture sensor, a smoke detector, a motion sensor, etc. In general, the sensors may have a set point that causes a trigger event, such as a moisture level, or a change in state, such as a door opening. The sensor 238 may also include a control protocol interface 248 for use in communicating with the controller 202. Other sensors 250, 252 may also be present in a home automation system 200.

A system and method as described above provide a benefit to a system operator by providing suggested scenes based on actual use, rather than requiring outside experts or extensive training. Further, the ability to use suggested scenes based on an equipment and respective controlled electronic devices inventory allows a system operator to benefit from the experience of a vast pool of other system operators. Even more, the ability to accept suggested scenes based on insurance claim activity, including recent experience for a vicinity, allows the homeowner/operator to benefit from an insurance company's natural desire to prevent losses.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method of suggesting an automation scene for a building having a building automation system configured with a controller for controlling a plurality of electronic devices, the method comprising:
    receiving, at a remote server from the controller via a network, an inventory identifying the plurality of electronic devices;
    comparing, by the remote server, the inventory to an additional inventory associated with an additional building automation system of an additional building to determine that the inventory is the same as or similar to the additional inventory, the additional inventory identifying a plurality of additional electronic devices implemented in the additional building automation system;
    identifying an automation scene that coordinates operation of at least a portion of the plurality of additional electronic devices; and
    providing, to the controller via the network, the automation scene for implementation in the building automation system.

2. The method of claim 1, further comprising:
    receiving, at the remote server from the additional building via the network, the additional inventory.

3. The method of claim 1, wherein comparing the inventory to the additional inventory to determine that the inventory is the same as or similar to the additional inventory comprises:
    determining that at least one part number of at least one of the plurality of electronic devices is the same as at least one additional part number of at least one of the plurality of additional electronic devices.

4. The method of claim 1, wherein comparing the inventory to the additional inventory to determine that the inventory is the same as or similar to the additional inventory comprises:
    determining that at least one functional identification of at least one of the plurality of electronic devices is the same as at least one additional functional identification of at least one of the plurality of additional electronic devices.

5. The method of claim 1, further comprising:
    verifying that the inventory includes the same or similar portion of the plurality of electronic devices as at least the portion of the plurality of additional electronic devices associated with the automation scene.

6. The method of claim 1, wherein the automation scene is implemented in the additional building automation system.

7. The method of claim 1, wherein providing the automation scene for implementation in the building automation system comprises:
    modifying the automation scene based on insurance claim data; and
    providing, to the controller via the network, the modified automation scene for implementation in the building automation system.

8. A system for suggesting an automation scene for a building having a building automation system for controlling a plurality of electronic devices, the system comprising:
    a network interface adapted to receive, from the building, an inventory identifying the plurality of electronic devices;
    a memory configured to store an additional inventory associated with an additional building automation system of an additional building;
    a processor adapted to interface with the network interface and the memory, and configured to execute computer executable instructions stored in the memory to cause the processor to:
        compare the inventory to the additional inventory to determine that the inventory is the same as or similar to the additional inventory, the additional inventory identifying a plurality of additional electronic devices implemented in the additional building automation system,
        identify an automation scene that coordinates operation of at least a portion of the plurality of additional electronic devices, and
        provide, to the building via the network interface, the automation scene for implementation in the building automation system.

9. The system of claim 8, wherein the network interface is further adapted to receive, from the additional building, the additional inventory identifying the plurality of additional electronic devices.

10. The system of claim 8, wherein the processor is adapted to compare the inventory to the additional inventory to determine that the inventory is the same as or similar to the additional inventory to cause the processor to:
   determine that at least one part number of at least one of the plurality of electronic devices is the same as at least one additional part number of at least one of the plurality of additional electronic devices.

11. The system of claim 8, wherein the processor is adapted to compare the inventory to the additional inventory to determine that the inventory is the same as or similar to the additional inventory to cause the processor to:
   determine that at least one functional identification of at least one of the plurality of electronic devices is the same as at least one additional functional identification of at least one of the plurality of additional electronic devices.

12. The system of claim 8, wherein the processor is configured to execute the computer executable instructions to further cause the processor to:
   verify that the inventory includes the same or similar portion of the plurality of electronic devices as at least the portion of the plurality of additional electronic devices associated with the automation scene.

13. The system of claim 8, wherein the automation scene is implemented in the additional building automation system.

14. The system of claim 8, wherein the processor is adapted to provide the automation scene for implementation in the building automation system to cause the processor to:
   modify the automation scene based on insurance claim data, and
   provide, to the building via the network interface, the modified automation scene for implementation in the building automation system.

15. A computer readable storage medium comprising non-transitory computer readable instructions stored thereon for suggesting an automation scene for a building having a building automation system for controlling a plurality of electronic devices, the instructions when executed on a processor cause the processor to:
   receive, from the building via a network, an inventory identifying the plurality of electronic devices;
   compare the inventory to an additional inventory associated with an additional building automation system of an additional building to determine that the inventory is the same as or similar to the additional inventory, the additional inventory identifying a plurality of additional electronic devices implemented in the additional building automation system;
   identify an automation scene that coordinates operation of at least a portion of the plurality of additional electronic devices; and
   provide, to the building via the network, the automation scene for implementation in the building automation system.

16. The computer readable storage medium of claim 15, wherein the processor compares the inventory to the additional inventory to determine that the inventory is the same as or similar to the additional inventory to cause the processor to:
   determine that at least one part number of at least one of the plurality of electronic devices is the same as at least one additional part number of at least one of the plurality of additional electronic devices.

17. The computer readable storage medium of claim 15, wherein the processor compares the inventory to the additional inventory to determine that the inventory is the same as or similar to the additional inventory to cause the processor to:
   determine that at least one functional identification of at least one of the plurality of electronic devices is the same as at least one additional functional identification of at least one of the plurality of additional electronic devices.

18. The computer readable storage medium of claim 15, wherein the instructions when executed on the processor further cause the processor to:
   verify that the inventory includes the same or similar portion of the plurality of electronic devices as at least the portion of the plurality of additional electronic devices associated with the automation scene.

19. The computer readable storage medium of claim 15, wherein the automation scene is implemented in the additional building automation system.

20. The computer readable storage medium of claim 15, wherein the processor provides the automation scene for implementation in the building automation system to cause the processor to:
   modify the automation scene based on insurance claim data; and
   provide, to the building via the network, the modified automation scene for implementation in the building automation system.

* * * * *